(12) United States Patent
Ohta et al.

(10) Patent No.: US 7,763,137 B2
(45) Date of Patent: Jul. 27, 2010

(54) PRESSURE SHELL, HIGH-PRESSURE TANK PROVIDED WITH THE PRESSURE SHELL, MANUFACTURING METHOD OF THE HIGH-PRESSURE TANK AND MANUFACTURING APPARATUS OF THE HIGH-PRESSURE TANK

(75) Inventors: Toshiaki Ohta, Fukuoka (JP); Hiromichi Onikura, Fukuoka (JP); Takao Sajima, Dazaifu (JP)

(73) Assignee: Kyushu University, National University Corporation, Fukuoka (JP)

( * ) Notice: Subject to any disclaimer, the term of this patent is extended or adjusted under 35 U.S.C. 154(b) by 1228 days.

(21) Appl. No.: 11/196,772

(22) PCT Filed: Feb. 3, 2004

(86) PCT No.: PCT/JP2004/001091

§ 371 (c)(1),
(2), (4) Date: Oct. 14, 2005

(87) PCT Pub. No.: WO2004/070258

PCT Pub. Date: Aug. 19, 2004

(65) Prior Publication Data

US 2006/0065664 A1    Mar. 30, 2006

(30) Foreign Application Priority Data

Feb. 3, 2003    (JP) .............................. 2003-26023

(51) Int. Cl.
*B65H 81/00* (2006.01)
(52) U.S. Cl. ........................ 156/172; 156/169; 156/173; 156/175

(58) Field of Classification Search ................ 156/169, 156/172, 173, 175, 425
See application file for complete search history.

(56) References Cited

U.S. PATENT DOCUMENTS 3,100,171 A * 8/1963 Hardesty ..................... 156/165
3,276,705 A * 10/1966 Erickson et al. .......... 242/419.9
3,316,337 A * 4/1967 North ......................... 264/231

(Continued)

FOREIGN PATENT DOCUMENTS

DE    4215756 A1 * 11/1993

(Continued)

*Primary Examiner*—Jeff H Aftergut
(74) *Attorney, Agent, or Firm*—Jordan and Hamburg LLP

(57) ABSTRACT

The present invention provides a pressure shell formed by winding reinforcement fibers with resin material for hardening on an outer surface of a hollow tank base body, a high-pressure tank having the pressure shell, a manufacturing method of the high-pressure tank, and an apparatus for manufacturing the high-pressure tank. The pressure shell adopts the laminated structure in which a large number of fiber layers each formed by winding the reinforcement fibers around the tank base body are laminated. In a state the inside of the high-pressure tank is emptied, a compressive stress is applied to a lower fiber layer and a tensile stress is applied to an upper fiber layer. Particularly, in winding the reinforcement fibers around the tank base body, the reinforcement fibers are wound while filling fluid for pressure regulation in the tank base body, regulating a pressure applied to the fluid for pressure regulation, and adjusting a tension applied to the reinforcement fibers.

3 Claims, 6 Drawing Sheets

U.S. PATENT DOCUMENTS

| | | | |
|---|---|---|---|
| 3,969,812 A * | 7/1976 | Beck | 29/421.1 |
| 4,187,738 A * | 2/1980 | Knight et al. | 74/572.12 |
| 4,514,245 A * | 4/1985 | Chabrier | 156/161 |
| 5,340,625 A * | 8/1994 | Weitsman et al. | 428/36.3 |
| 2002/0088806 A1 | 7/2002 | Takaku et al. | |

FOREIGN PATENT DOCUMENTS

| | | | |
|---|---|---|---|
| JP | 50-144121 | | 11/1975 |
| JP | 9-203496 | | 8/1997 |
| JP | 2000-266288 | | 9/2000 |
| JP | 2001-260240 | A * | 9/2001 |
| JP | 2002-188794 | | 7/2002 |
| JP | 2002-542084 | | 12/2002 |

* cited by examiner

PRESSURE SHELL, HIGH-PRESSURE TANK PROVIDED WITH THE PRESSURE SHELL, MANUFACTURING METHOD OF THE HIGH-PRESSURE TANK AND MANUFACTURING APPARATUS OF THE HIGH-PRESSURE TANK

TECHNICAL FIELD

The present invention relates to a pressure shell which is formed on an outer peripheral surface of a tank which accommodates gas or liquid therein so as to enhance the pressure tightness of the tank, a high-pressure tank provided with the pressure shell, a manufacturing method of the high-pressure tank and a manufacturing apparatus of the high-pressure tank.

BACKGROUND OF THE INVENTION

Conventionally, to supply hydrogen used as fuel of a fuel-cell-powered vehicle or to store liquefied oxygen under a severe use condition such as a cosmic space, a high-pressure tank which enhances the pressure tightness is used.

Particularly, Japanese Patent Laid-Open 2002-188794 describes the high-pressure tank in which a tank base body is constituted of a liner made of high-density polyethylene and reinforcement fibers such as carbon fibers to which an adhesive agent such as epoxy resin is applied and which are wound around an outer surface of the liner.

In such a high-pressure tank, the reinforcement fibers are wound around the outer surface of the liner while applying a fixed winding tension to the reinforcement fibers and, after finishing the winding operation, the epoxy resin which is applied to the reinforcement fibers or the like is hardened by hardening treatment under given conditions thus forming a pressure shell.

Further, after hardening the epoxy resin, in a state that the inside of the high-pressure tank is emptied, no stress is applied to the pressure shell.

In such a high-pressure tank, when the pressure inside the high-pressure tank is elevated along with the filling of gas or liquid to the inside of the high-pressure tank, as shown in FIG. 11, to the reinforcement fibers of an inner-side portion of the pressure shell, a tensile stress which is larger than a tensile stress applied to the reinforcement fibers of an outer-side portion of the pressure shell is applied and hence, a limit pressure of the high-pressure tank is determined when the stress which is applied to the reinforcement fibers of the inner-side portion of the pressure shell exceeds a tension limit of the reinforcement fibers.

In this case, in spite of the fact that the reinforcement fibers of the outer-side portion of the pressure shell do not reach the tension limit, the limit pressure of the high-pressure tank is determined and hence, a value of the limit pressure is relatively small.

Accordingly, a range of application of a product provided with the pressure shell is narrowed thus giving rise to a drawback that the availability of the pressure shell is lowered. Particularly, when the high-pressure tank provided with such a pressure shell accommodates gas therein, a gas accommodating quantity is decreased due to the small limit pressure.

Accordingly, inventors of the present invention have tried to increase the value of the limit pressure by lifting the pressure value inside the high-pressure tank at which the reinforcement fibers of the inner-side portion of the pressure shell reaches the tension limit to the pressure value inside the high-pressure tank at which the reinforcement fibers of the outer-side portion of the pressure shell reaches the tension limit, and have made studies and developments, and have arrived at present invention.

DISCLOSURE OF THE INVENTION

According to a pressure shell described in claim 1, in the pressure shell which adopts the laminated structure which is formed by laminating a large number of fiber layers formed by winding reinforcement fibers provided with resin material for hardening on an outer surface of a base body, in a state that an external force is not applied to the pressure shell, a compressive stress is applied to the lower fiber layer and, at the same time, a tensile stress is applied to the upper fiber layer. Due to such a constitution, it is possible to enhance the limit pressure of the pressure shell by an amount of pressure which is necessary for eliminating the compressive stress applied to the lower fiber layer and hence, it is possible to increase an allowable range of a product which uses the pressure shell.

According to a high-pressure tank described in claim 2, in the high-pressure tank provided with a pressure shell which is formed by winding reinforcement fibers provided with resin material for hardening on an outer surface of an hollow tank base body, the pressure shell is constituted of the multilayered structure which is formed by laminating a large number of fiber layers which are formed by winding reinforcement fibers around the tank base body, and in a state that the inside of the high-pressure tank is emptied, a compressive stress is applied to the lower fiber layer and, at the same time, a tensile stress is applied to the upper fiber layer. Due to such a constitution, when the gas or liquid is filled in the inside of the high-pressure tank, with respect to the lower fiber layer, the compressive stress is eliminated along with the filling of the gas or the liquid and, after the elimination of the compressive stress, the applying of the tensile stress is started and hence, the limit pressure at which the lower fiber layer reaches the tension limit can be enhanced, whereby an accommodating quantity of the gas or the liquid in the high-pressure tank can be increased.

According to a manufacturing method of a high-pressure tank described in claim 3, in the manufacturing method of the high-pressure tank provided with a pressure shell which is formed by winding reinforcement fibers provided with resin material for hardening on an outer surface of an hollow tank base body, fluid for pressure regulation is filled in the inside of the tank base body, and the fiber layer is formed by winding the reinforcement fibers to which a winding tension is applied on the tank base body while pressurizing the fluid for pressure regulation and, at the same time, a large number of fiber layers are laminated to form the pressure shell. Due to such a constitution, in a state that the inside of the manufactured high-pressure tank is emptied, it is possible to apply a compressive stress to the lower fiber layer. Accordingly, when the gas or the liquid is filled in the inside of the high-pressure tank, with respect to lower fiber layer, the compressive stress is eliminated along with the filling of the gas or the liquid and, after the elimination of the compressive stress, the applying of the tensile stress is started and hence, the limit pressure of the high-pressure tank at which the lower fiber layer reaches the tension limit can be enhanced, whereby an accommodating quantity of the gas or the liquid in the high-pressure tank can be increased.

According to a manufacturing method of a high-pressure tank described in claim 4, in the manufacturing method of the high-pressure tank described in claim 3, the pressurizing conditions of the fluid for pressure regulation and winding tension conditions applied to the reinforcement fibers are regulated along with the lamination of the fiber layers. Due to such a constitution, it is possible to control a stress which is generated in the fiber layers of the pressure shell after the formation of the high-pressure tank to a given stress and hence, the reliability of the high-pressure tank can be enhanced.

According to a manufacturing method of a high-pressure tank described in claim 5, in the manufacturing method of the high-pressure tank described in claim 3, in forming the lowermost fiber layer, the fiber layer is formed by setting a pressure applied to the fluid for pressure regulation to 0.01 to 100 MPa and a tension applied to the reinforcement fibers to 1 to 1000 N, while in laminating a new fiber layer, the new fiber layer is formed by gradually decreasing the pressure applied to the fluid for pressure regulation corresponding to the number of laminated layers and, at the same time, by gradually increasing the tension applied to the reinforcement fibers corresponding to the number of laminated layers. Due to such a constitution, it is possible to control the stress generated in the fiber layers of the pressure shell after the formation of the high-pressure tank to a given stress and, at the same time, the limit pressure can be increased as much as possible.

According to a manufacturing method of a high-pressure tank described in claim 6, in the manufacturing method of the high-pressure tank described in any one of claims 3 to 5, the fiber layer is formed by accelerating the hardening of the resin material for hardening applied to the reinforcement fibers by heating the fluid for pressure regulation. Due to such a constitution, it is possible to harden the reinforcement fibers which are wound at given positions one by one and hence, the fiber layers can be formed speedily. Further, since the new fiber layer can be formed on an upper surface of the sufficiently hardened fiber layer and hence, it is possible to generate stress in the respective fiber layers in a stable manner whereby the further enhancement of the reliability of the high-pressure tank can be obtained. Still further, by forming the pressure shell while hardening resin materials for hardening one by one, it is possible to make the hardening treatment which is performed by accommodating the high-pressure tank in an oven or the like after the formation of the uppermost fiber layer unnecessary.

According to a manufacturing apparatus of a high-pressure tank described in claim 7, in the manufacturing apparatus of the high-pressure tank which includes a pressure shell which is formed by winding reinforcement fibers provided with resin material for hardening on an outer surface of a hollow tank base body using a reinforcement fiber winding means, fluid for pressure regulation is filled in the inside of the tank base body, and the manufacturing apparatus includes pressure regulating means which regulates a pressure applied to the fluid for pressure regulation, wherein a fiber layer is formed by winding the reinforcement fibers on the outer surface of the tank base body using the reinforcement fiber winding means while pressurizing the fluid for pressure regulation using the pressure regulating means and, at the same time, a large number of fiber layers are laminated to form the pressure shell. Due to such a constitution, with respect to the manufactured high-pressure tank, it is possible to apply a compressive stress to the lower fiber layer in an emptied state and hence, when the gas or the liquid is filled in the inside of the high-pressure tank, the compressive stress is eliminated along with the filling of the gas or the liquid with respect to the lower fiber layer and, after the elimination of the compressive stress, the applying of the tensile stress is started and hence, the limit pressure of the high-pressure tank at which the lowermost fiber layer reaches the tension limit can be enhanced, whereby it is possible to manufacture the high-pressure tank which increases an accommodating quantity of the gas or the liquid.

According to a manufacturing apparatus of a high-pressure tank described in claim 8, in the manufacturing apparatus of the high-pressure tank described in claim 7, the reinforcement fiber winding means is constituted such that the reinforcement fibers are wound around the tank base body while regulating winding tension conditions applied to the reinforcement fibers by correlating the winding tension conditions with the pressurizing conditions of the fluid for pressure regulation using the pressure regulating means. Due to such a constitution, it is possible to easily control a compressive stress generated in the lower fiber layer after the formation of the high-pressure tank to a given stress and hence, the limit pressure of the high-pressure tank at which the lower fiber layer reaches the tension limit can be further enhanced whereby it is possible to form the high-pressure tank of the given limit pressure using the relatively small number of fiber layers. Accordingly, it is possible to manufacture the light-weighted high-pressure tank.

According to a manufacturing apparatus of a high-pressure tank described in claim 9, in the manufacturing apparatus of the high-pressure tank described in claim 7 or claim 8, a heating means which heats the fluid for pressure regulation is provided, and the fiber layer is formed by accelerating the hardening of the resin material for hardening applied to the reinforcement fibers with heat added by the heating means. Due to such a constitution, it is possible to harden the reinforcement fibers which are wound at given positions one by one and hence, the fiber layers can be speedily formed and, at the same time, the hardening treatment which is performed by accommodating the high-pressure tank in the inside of an oven or the like after the formation of the uppermost fiber layer can be made unnecessary. Further, the new layer can be formed on an upper surface of the sufficiently hardened fiber layer and hence, it is possible to generate stresses in the respective fiber layers in a stable manner and hence, the further enhancement of the limit pressure in the high-pressure tank can be obtained.

According to a manufacturing apparatus of a high-pressure tank described in claim 10, in the manufacturing apparatus of the high-pressure tank described in any one of claims 7 to 9, the tank base body is fixedly supported by a first end plate support body and a second end plate support body which are mounted on a supply pipe which is inserted in the inside of the tank base body and supplies the fluid for pressure regulation. Due to such a constitution, it is possible to use a material having resiliency as a material of the tank base body and hence, a manufacturing cost of the tank base body can be reduced whereby it is possible to manufacture the high-pressure tank at a low cost.

BEST MODE FOR CARRYING OUT THE INVENTION

A pressure shell of the present invention is configured such that a fiber layer is formed by winding reinforcement fibers provided with resin material for hardening around an outer surface of a base body on which the pressure shell is formed, and a large number of fiber layers are laminated to form the laminated structure.

Particularly, with respect to the pressure shell, in a state that an external force is not applied to the pressure shell, a compressive stress is applied to the lower fiber layer and, at the same time, a tensile stress is applied to an upper fiber layer.

The compressive stress in the lower fiber layer and the tensile stress in the upper fiber layer are generated by making use of an action that the pressure shell per se is brought into a stress equilibrium state in a state that an external force is not applied to the pressure shell.

Further, when an expansion pressure is applied to the base body which forms the pressure shell, in the lower fiber layer, the compressive stress which is applied to the fiber layers is eliminated along with the expansion of the base body and, after the expansion, the action of the tensile stress is started and hence, the pressure resistance performance of the pressure shell can be enhanced by a pressure quantity which is required for eliminating the compressive stress applied to the fiber layer.

The high-pressure tank provided with the pressure shell is specifically explained hereinafter.

Figure 1:
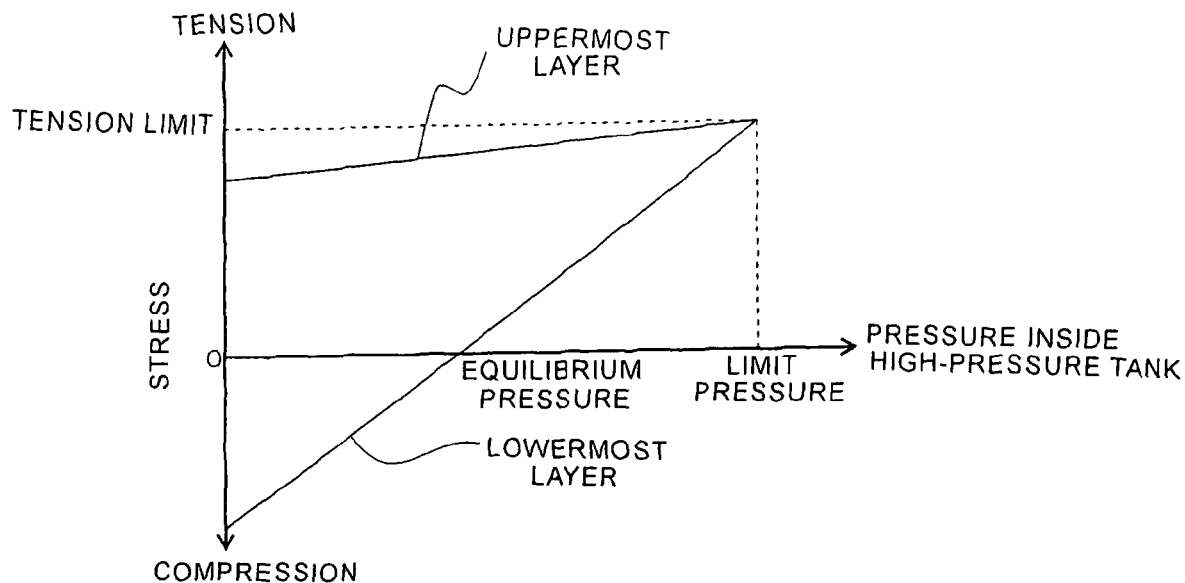
FIG. 1 is a graph showing the relationship between a stress applied to a pressure shell according to the present invention and a pressure inside a high-pressure tank provided with the pressure shell.

The pressure shell provided to the high-pressure tank has the laminated structure in which a large number of fiber layers which are formed by winding reinforcement fibers with resin material for hardening are laminated to an outer surface of a hollow tank base body. As shown in FIG. 1, in a state that the inside of the high-pressure tank is emptied, a compressive stress is applied to the lower fiber layer, while a tensile stress is applied to the upper fiber layer.

Particularly, the largest compressive stress is applied to the lowermost fiber layer among the respective layers of the pressure shell, while the largest tensile stress is applied to the lowermost fiber layer among the respective layers of the pressure shell.

Then, when the inside of the high-pressure tank is filled with gas or liquid, the pressure inside the high-pressure tank (hereinafter referred to as "inner pressure") is elevated so that the high-pressure tank is bulged. Due to this bulging action of the high-pressure tank, the compressive stress which is applied to the lower fiber layer of the pressure shell is gradually eliminated as shown in FIG. 1.

Further, when the inner pressure obtains a given pressure, the compressive stress applied to the lowermost fiber layer is eliminated. The inner pressure at a point of time that the compressive stress applied to the lowermost fiber layer is eliminated is referred to as an equilibrium pressure. Here, to the fiber layers to which the compressive stress is applied initially, after the elimination of the compressive stress along with the elevation of the inner pressure, the tensile stress is applied.

On the other hand, in the upper-side fiber layer of the pressure shell, the tensile stress is gradually increased due to the bulging action of the high-pressure tank.

By further increasing the inner pressure than the equilibrium pressure, the high-pressure tank is further bulged. Accordingly, the stress applied to the lowermost fiber layer of the pressure shell also becomes the tensile stress and the tensile stress is increased along with the elevation of the inner pressure. Further, also in the fiber layers other than the lowermost fiber layer of the pressure shell, the tensile stress is gradually increased along with the elevation of the inner pressure.

Further, when at least either one of the tensile stresses which are respectively applied to the lowermost fiber layer and the uppermost fiber layer of the pressure shell reaches the tension limit, the inner pressure at such a point of time becomes the limit pressure.

The inner pressure which is generated when the tensile stress which is applied to the lowermost fiber layer of the pressure shell reaches the tension limit is referred to as the lowermost layer limit pressure. Further, the inner pressure which is generated when the tensile stress which is applied to the uppermost fiber layer of the pressure shell reaches the tension limit is referred to as the uppermost layer limit pressure. Still further, the inner pressure which is generated when the tensile stress which is applied to the fiber layer disposed between the lowermost fiber layer and the uppermost fiber layer of the pressure shell reaches the tension limit is referred to as the intermediate layer limit pressure.

In this manner, by generating the given compressive stress in the lower fiber layer of the pressure shell and, at the same time, by generating the given tensile stress in the upper fiber layer of the pressure shell and by making use of the action to bring the internal stresses in the pressure shell into the equilibrium state, it is possible to increase the lowermost layer limit pressure by a quantity of the equilibrium pressure which can eliminate all compressive stress in the lower fiber layer of the pressure shell and hence, the limit pressure of the high-pressure tank can be enhanced.

Accordingly, it is possible to fill a larger quantity of gas or liquid in the high-pressure tank and hence, an accommodation quantity of gas or liquid in the high-pressure tank can be increased.

Particularly, by adjusting the compressive stress which is generated in the lower-layer-side of the pressure shell such that the lowermost layer limit pressure becomes larger than the upper most layer limit pressure, it is possible to set the limit pressure of the high-pressure tank to the uppermost layer limit pressure whereby the limit pressure can be largely enhanced.

Here, in FIG. 1, the lowermost layer limit pressure and the uppermost layer limit pressure are configured to substantially agree to each other thus preventing the lowering of the efficiency attributed to the generation of compressive stress more than necessity in the lower fiber layer of the pressure shell.

Figure 2:
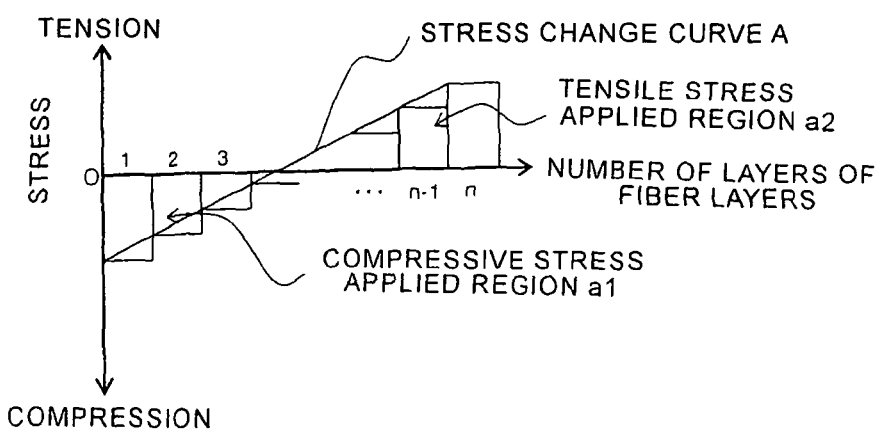
FIG. 2 is a graph showing the relationship between stresses which are applied to respective fiber layers in the pressure shell formed in the high-pressure tank according to the present invention and the fiber layers.

The plurality of fiber layers which constitute the pressure shell are laminated such that, as shown in FIG. 2, as the order of layers advances from the lowermost first layer to the uppermost nth layer, the compressive stress is gradually decreased and, thereafter, the tensile stress is gradually increased. In FIG. 2, A indicates a stress change curve of the compressive stress and the tensile stress applied to each fiber layer. In FIG. 2, although the stress change curve A is described as an approximately straight line, the stress change curve A may take any suitable curved shape and it is desirable to adjust the stress change curve A such that the intermediate-layer limit pressure assumes a value not smaller than the uppermost-layer limit pressure.

Here, the pressure shell assumes the stress equilibrium state when the inside of the high-pressure tank is emptied and hence, when the stress change is graphed as shown in FIG. 2, a compressive stress applied area a1 and a tensile stress applied area a2 become substantially equal.

To surely apply the compressive stress to the lower-side fiber layer in a state that the inside of the high-pressure tank is emptied as described above, following steps are taken.

First of all, fluid for pressure regulation (hereinafter referred to as "pressure regulating fluid") is filled in the inside of the hollow tank base body and the pressure regulating fluid is pressurized at a given pressure so as to bulge the tank base body. The pressure which generates the bulging of the tank base body is referred to as a bulging pressure. Here, it is assumed that the bulging pressure P1 is applied to the tank base body.

Next, the first-layer fiber layer is formed by winding the reinforcement fibers around the outer surface of the tank base body. In winding the reinforcement fibers around the tank base body, the reinforcement fibers are wound while applying a given winding tension to the reinforcement fibers so as to cover the tank base body with the reinforcement fibers.

Accordingly, the tensile stress is applied to the first-layer fiber layer. Particularly, by applying the bulging pressure P1 to the tank base body, it is possible to impart the further larger winding tension to the reinforcement fibers.

After the formation of the first-layer fiber layer, the winding of the reinforcement fibers which forms the second-layer fiber layer on an upper surface of the first-layer fiber layer is performed. Also in performing the winding operation of the reinforcement fiber to form the second-layer fiber layer, the bulging force P1 is applied to the tank base body and, at the same time, the reinforcement fibers are wound while applying a given winding tension to the reinforcement fibers so as to cover the tank base body with the reinforcement fibers thus forming the second-layer fiber layer.

Figure 3:
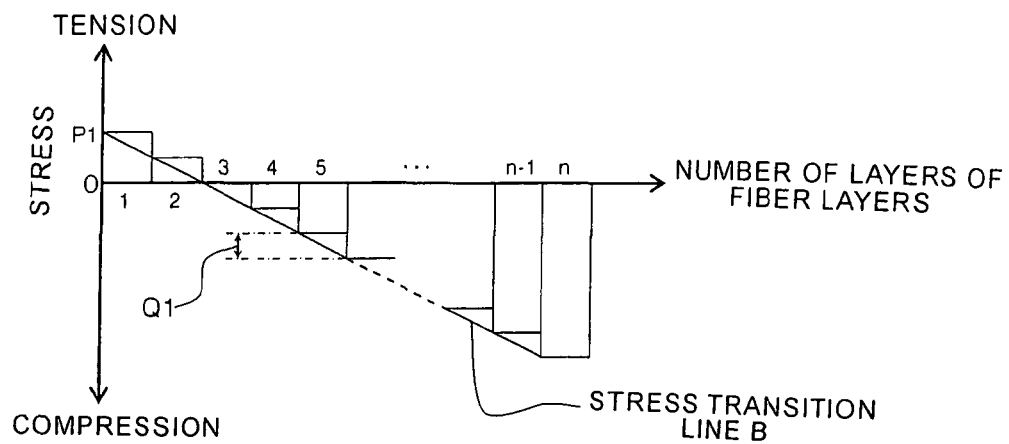
FIG. 3 is a graph showing a stress transition line in the fiber layer which constitutes the first layer.

Due to the tensile stress which is generated in the second-layer fiber layer along with the formation of the second-layer fiber layer, as shown in FIG. 3, the stress transition in the compressive direction is generated in the first-layer fiber layer and the stress which is applied to the first-layer fiber layer is shifted in the compressive direction by a given transition quantity Q1.

Hereinafter, by forming the desired number of fiber layers one after another in the same manner, the transition of stress in the compressive direction is generated in the first-layer fiber layer one after another and this transition is expressed as a stress transition line B as shown in FIG. 3.

A transition quantity Q1 of the stress in the lower fiber layer generated along with the formation of the fiber layer can be adjusted based on the winding tension applied to the reinforcement fibers at the time of winding the reinforcement fibers around the tank base body.

Figure 4:
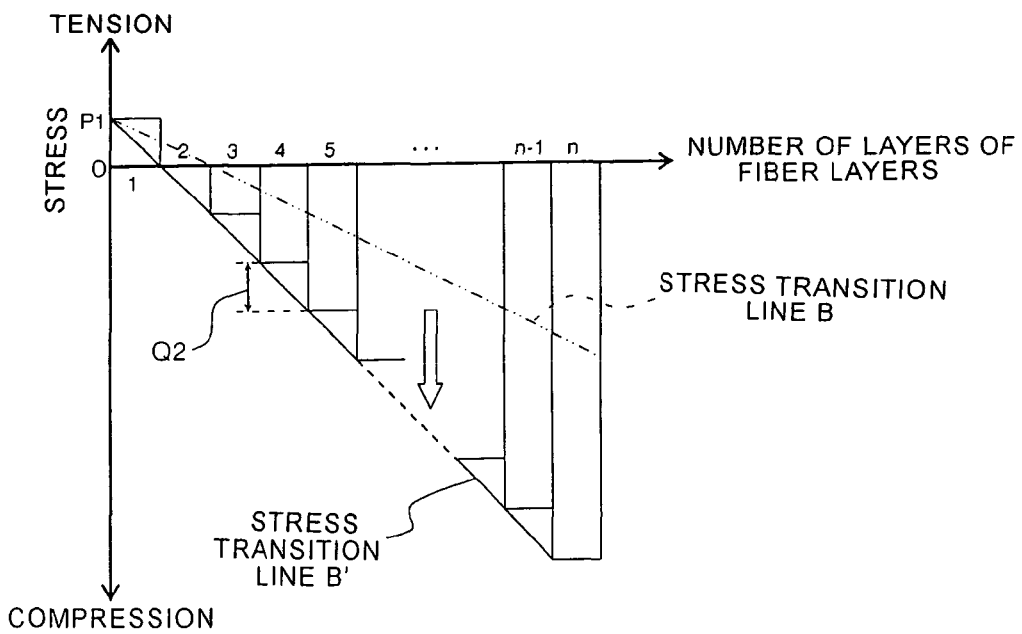
FIG. 4 is a graph showing the stress transition line in the fiber layer which constitutes the first layer.

For example, when the winding tension is further increased, as shown in FIG. 4, the magnitude of the transition quantity Q2 becomes larger than the magnitude of the transition quantity Q1 in FIG. 3 and hence, the magnitude of the inclination of a stress transition line B' can be further increased. Here, the bulging pressure P1 applied to the tank base body is set to a fixed value.

Figure 5:
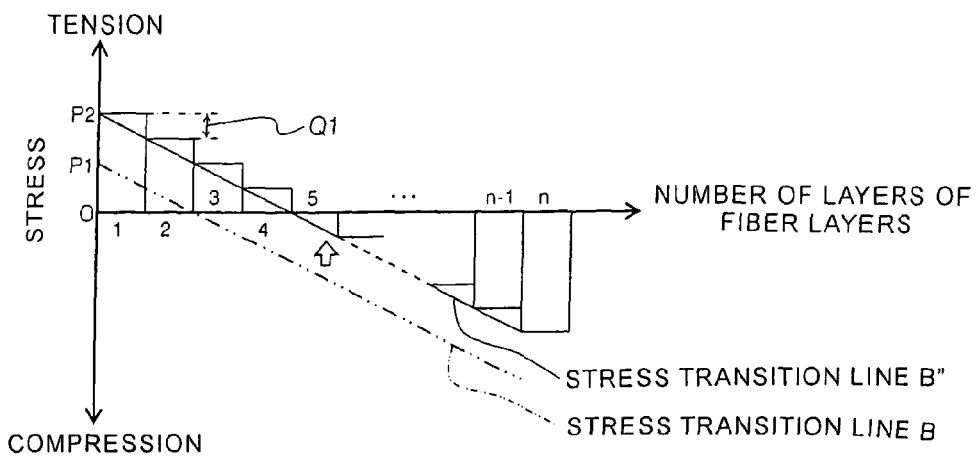
FIG. 5 is a graph showing the stress transition line in the fiber layer which constitutes the first layer.

Further, when the bulging pressure P1 applied to the tank base body is adjusted along with the winding tension of the reinforcement fibers, for example, when the bulging pressure P2 which is larger than the bulging pressure P1 is adopted, as shown in FIG. 5, it is possible to obtain a stress transition line B" by shifting the stress transition line B in parallel in the pressure axis (y axis) direction. Here, the winding tension applied to the reinforcement fibers is set to a fixed value.

That is, with respect to the stress transition line B, it is possible to adjust a y-axis intercept by adjusting the bulging pressure P1 and it is also possible to adjust the inclination by adjusting the winding tension of the reinforcement fibers and hence, it is possible to obtain an arbitrary stress transition line B by adjusting the bulging pressure P1 and the winding tension of the reinforcement fibers.

Particularly, when the further larger winding tension of the reinforcement fibers is required, by increasing the bulging pressure P1, it is possible to perform the winding without breaking the reinforcement fibers at the time of winding the reinforcement fibers around the tank base body.

Figure 6:
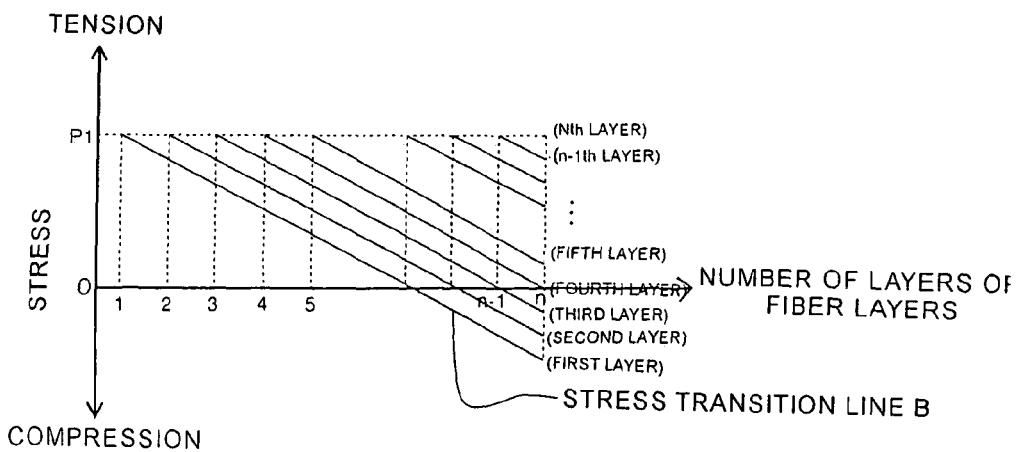
FIG. 6 is a graph showing stress transition lines in respective fiber layers in the pressure shell formed in the high-pressure tank according to the present invention.

Here, FIG. 3 to FIG. 5 respectively show the stress transition lines in the first fiber layer, wherein to express the stress transition lines B of all fiber layers (the first layer to the nth layer) which are formed on the tank base body under condition that the bulging pressure P1 applied to the tank base body is always set to a fixed value and the winding tension applied to the reinforcement fibers is always set to a fixed value, they become as shown in FIG. 6.

Then, after the formation of the pressure shell which is completed by forming all fiber layers, by eliminating the bulging pressure P1 along with the removal of the pressure regulating fluid in the inside of the tank base body, an action which brings the internal stress of the pressure shell into an equilibrium state is generated in the pressure shell and, based on the action, all stress transition lines are shifted in parallel toward the compressive stress side.

As a result, it is possible to generate stresses which are expressed as the stress change curve A shown in FIG. 2 in the fiber layers which constitute the pressure shell and hence, it is possible to apply the compressive stress to the lower fibers layer and, at the same time, it is possible to apply the tensile stress to the upper fiber layers.

The embodiments of the manufacturing method of the high-pressure tank and the manufacturing apparatus of the high-pressure tank according to the present invention are explained in conjunction with drawings hereinafter.

First of all, the explanation is made with respect to the tank base body which is used in the manufacture of the high-pressure tank. Here, although the high-pressure tank according to this embodiment is used for accommodating hydrogen gas, the high-pressure tank may be used for accommodating a material to be accommodated other than the hydrogen gas.

Figure 7:
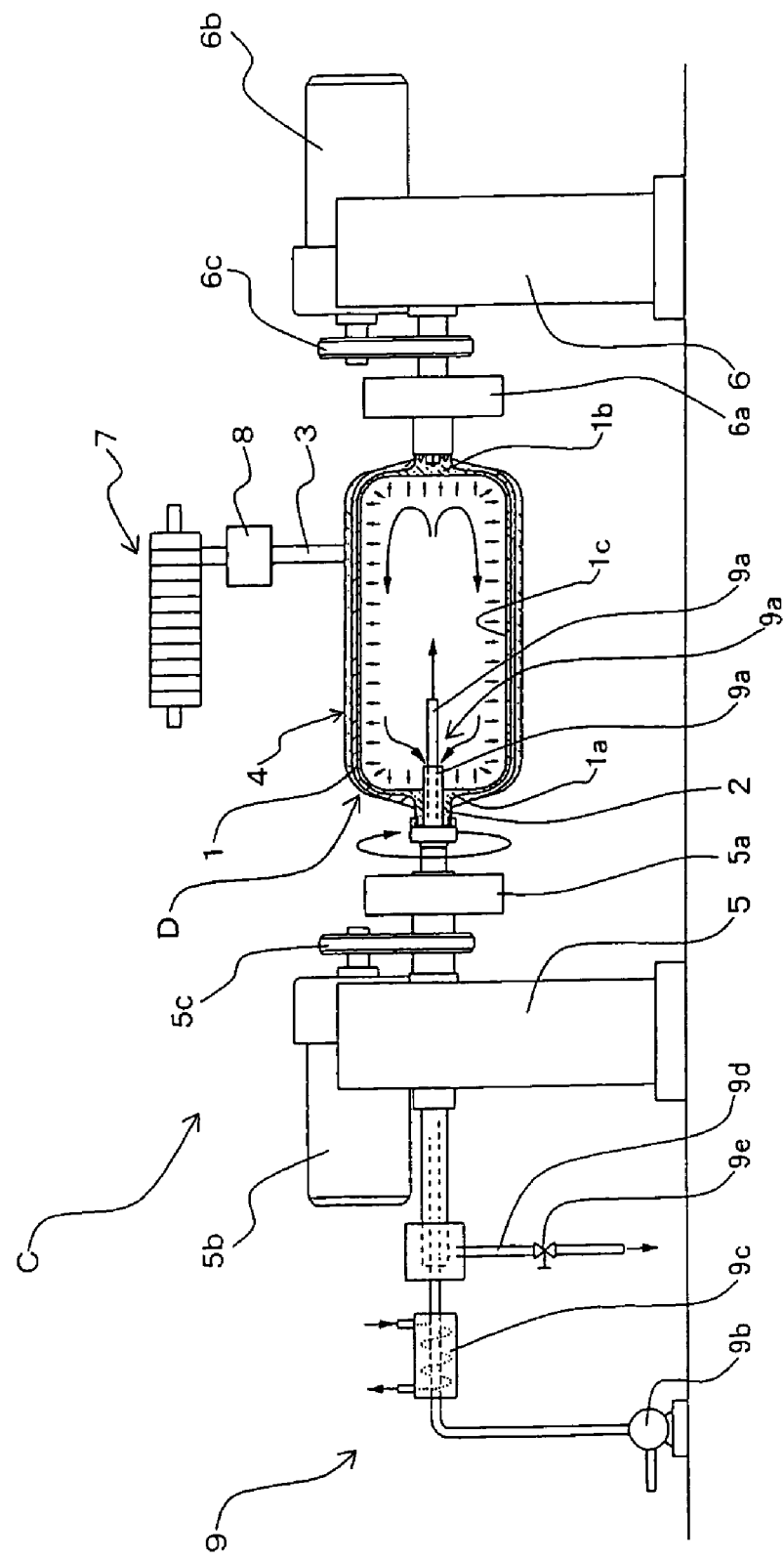
FIG. 7 is an explanatory view of a high-pressure tank manufacturing apparatus according to the present invention.

In this embodiment, the tank base body 1 constitutes, as shown in FIG. 7, a cylindrical pressure vessel which is formed using high-density polyethylene, wherein the tank base body 1 is constituted of an upper end plate portion 1*a* provided with an opening portion 2, a lower end plate portion 1*b* which faces the upper end plate portion 1a in an opposed manner, and a cylindrical drum portion 1*c* which connects the upper end plate portion 1a and the lower end plate portion 1*b*.

In this embodiment, the tank base body 1 is formed of a liner and is made of a material and has the constitution so as to prevent the leaking of the hydrogen gas when the hydrogen gas is filled in the inside of the high-pressure tank manufactured using this tank base body 1.

Here, the tank base body 1 may be configured such that the drum portion 1c is removed while leaving the upper end plate portion 1a and the lower end plate portion 1b after the formation of the pressure shell 4.

That is, after the formation of the high-pressure tank, the drum portion 1c may be resolved and removed by using a suitable solution or the like, or the drum portion 1c may be configured of a resilient material and may be taken out and removed from the opening portion 2 formed on the upper-side mirror portion 1a.

Here, a material of the tank base body 1 is not limited to the synthetic resin and metal may be used as the material of the tank base body 1. Alternatively, only the upper end plate portion 1a and the lower end plate portion 1b are made of metal such as aluminum.

The high-pressure tank D is manufactured such that the above-mentioned tank base body 1 is mounted on the high-pressure tank manufacturing apparatus C and the reinforcement fibers 3 are wound around the tank base body 1 in multiple layers thus forming the pressure shell 4.

The high-pressure tank manufacturing apparatus C is constituted of, as shown in FIG. 7, a front end support base 5 which supports a front end of the tank base body 1, a rear end support base 6 which supports a rear end of the tank base body 1, a reinforcement fiber feeding portion 7 which feeds the reinforcing fibers 3 to be wound around the tank base body 1 which is supported on the front and rear end support bases 5, 6, a winding tension adjusting portion 8 which applies a given winding tension to the reinforcement fibers 3, and a pressure regulating fluid supplying portion 9 which supplies the pressure regulating fluid to be filled in the inside of the tank base body 1.

A front-end connecting member 5a is mounted on the front-end support base 5, wherein the front-end connecting member 5a is connected with the upper end plate portion 1a of the tank base body 1 and is set rotatable with respect to the front-end support base 5.

The front-end connecting member 5a is rotatably driven by a first drive motor 5b mounted on the front-end support base 5. Numeral 5c indicates a connecting belt which connects the front-end connecting member 5a and the first drive motor 5b in an interlocking manner.

A rear-end connecting member 6a is mounted on the rear-end support base 6, wherein the rear-end connecting member 6a is connected with the lower end plate portion 1b of the tank base body 1 and is set rotatable with respect to the rear-end support base 6.

The rear-end connecting member 6a is rotatably driven by a second drive motor 6b mounted on the rear-end support base 6. Numeral 6c indicates a connecting belt which connects the rear-end connecting member 6a and the second drive motor 6b in an interlocking manner.

Particularly, the front-end support base 5 and the rear-end support base 6 are arranged in a mirror-face symmetry, wherein a rotary shaft of the front-end connecting member 5a and a rotary shaft of the rear-end connecting member 6a are arranged to be located on the same straight line, and the tank base body 1 which has both ends thereof supported by the front-end support base 5 and the rear-end support base 6 is set rotatable at a desired speed.

The reinforcement fiber feeding portion 7 holds a reel (not shown in the drawing) which winds the reinforcement fibers thereon and is capable of feeding the reinforcement fibers 3.

Further, although not shown in the drawing, the reinforcement fiber feeding portion 7 includes a resin coating portion which applies resin material for hardening to the fed reinforcement fibers 3 by coating.

Here, although carbon fibers are used as the reinforcement fiber 3 used in this embodiment, besides the carbon fibers, aramid fibers, glass fibers, PBO fibers or the like may be used. Further, composite fibers of these fibers may be also used. Further, although epoxy resin is used as the resin material for hardening, other adhesive resin may be used as the resin material for hardening. For example, ultra-violet-ray curing type adhesive resin which is hardened by ultra violet rays may be used.

The winding tension adjusting portion 8 is configured to apply the desired winding tension to the reinforcement fibers 3 which are wound around the tank base body 1 and applies the desired winding tension to the reinforcement fibers 3 in response to a control by a control portion not shown in the drawing.

The reinforcement fiber feeding portion 7 and the winding tension adjusting portion 8 constitute a reinforcement fiber winding means and, when necessary, a winding arm which efficiently performs the winding operation of the reinforcement fibers 3 around the tank base body 1 may be provided.

The pressure regulating fluid supplying portion 9 is constituted of a feed pipe 9a which has one end thereof inserted into the inside of the tank base body 1 which is supported on the front-end support base 5 and the rear-end support base 6, and a feed pump 9b and a heater 9c which are sequentially mounted on the feed pipe 9a from an upper stream side.

Particularly, in this embodiment, the feed pipe 9a has a portion thereof which is inserted into the inside of the tank base body 1 constituted of a duplicate pipe, wherein an inner pipe 9a' defines a feed passage and an outer piper 9a'' defines a discharge passage and the pressure regulating fluid which is fed to the inside of the tank base body 1 through the inner pipe 9a' is discharged outside the tank base body 1 through the outer pipe 9a''.

The pressure regulating fluid which is discharged to the outside of the tank base body 1 through the outer pipe 9a'' is configured to be discharged through a discharge pipe 9d and a pressure regulating valve 9e is mounted on a middle portion of the discharge pipe 9d.

The pressure regulating valve 9e is connected with the above-mentioned control part, wherein by performing a discharge control based on a control performed by the control part, it is possible to generate a given pressure, that is, the previously-mentioned bulging pressure in the inside of the tank base body 1.

Further, the feed pump 9b which feeds the pressure regulating fluid into the feed pipe 9a under pressure is also connected with the control part and can regulate a pressurized feed quantity of the pressure regulating fluid by the feed pump 9b. The pressure regulating valve 9e and the feed pump 9b constitute the pressure regulating means.

The heater 9c is a heating device which heats the pressure regulating fluid which is fed in the inside of the feed pipe 9a under pressure to a given temperature.

In this embodiment, water is used as the pressure regulating fluid and a high-frequency heating coil which is wound around an outer periphery of the feed pipe 9a is used as the heater 9c.

The pressure regulating fluid is not limited to water and may be liquid other than water or gas such as vapor. Further, the heater 9c is not limited to the heater which is constituted of the high-frequency heating coil and any suitable device which can efficiently heat the pressure regulating fluid can be used.

The manufacture of the high-pressure tank D using the above-mentioned high-pressure tank manufacturing apparatus C is conducted as follows.

First of all, the tank base body 1 is mounted on the high-pressure tank manufacturing apparatus C. That is, the feed pipe 9a is inserted into the inside of the tank base body 1 through the opening portion 2 of the tank base body 1, the upper end plate portion 1a of the tank base body 1 is connected to the front-end connecting member 5a of the front-end support base 5 and, thereafter, the lower end plate portion 1b of the tank base body 1 is connected to the rear-end connecting member 6a of the rear-end support base 6 whereby the tank base body 1 is mounted on the high-pressure tank manufacturing apparatus C.

Next, while controlling the pressure regulating valve 9e and the feed pump 9b by the control part, the pressure regulating fluid is filled in the inside of the tank base body 1 and, at the same time, the bulging pressure is applied to the tank base body 1 using the pressure regulating fluid.

It is sufficient that the bulging pressure of 0 to 100 MPa (absolute pressure) can be applied. Particularly, in forming the first layer which constitutes the lowermost layer, it is desirable to set the bulging pressure to 0.01 to 100 MPa. In this embodiment, the bulging pressure is set to approximately 0.4MPa.

Further, here, the pressure regulating fluid is heated by the heater 9c so as to heat the tank base body 1 at the predetermined temperature.

The heating temperature of the tank base body 1 may be set based on the resin hardening temperature of the resin material for hardening which is applied to the reinforcement fibers 3 and may usually falls within a range of 60 to 150° C.

Here, the heating state of the tank base body 1 is indirectly measured by measuring the temperature of the pressure regulating fluid with a temperature sensor not shown in the drawing and the control part controls the heater 9c based on the measurement result so as to set the tank base body 1 at the given temperature.

In this embodiment, water is used as the pressure regulating fluid and the epoxy resin is used as the resin material for hardening and hence, the temperature of the pressure regulating fluid is set to 70 to 90° C.

When the tank base body 1 reaches the given temperature, the winding of the reinforcement fibers 3 to the tank base body 1 is started.

Figure 8:
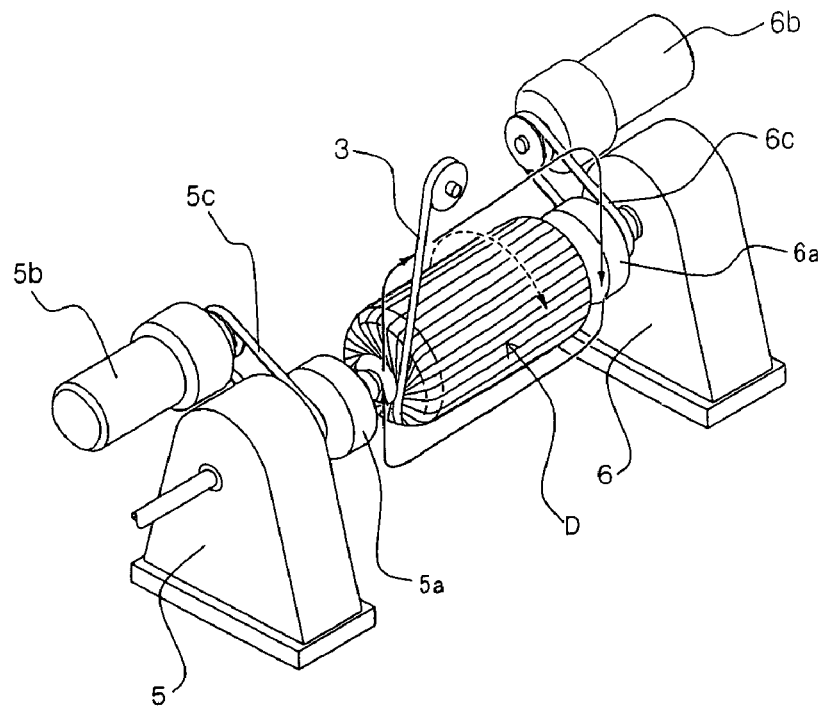
FIG. 8 is an explanatory view showing a winding method of reinforcement fibers to a tank base body.

Particularly, in this embodiment, with respect to the first fiber layer, as shown in FIG. 8, the reinforcement fibers 3 are wound in the longitudinal direction of the tank base body 1, that is, along the extending direction of the tank base body 1 thus forming the first fiber layer.

Here, in forming the first fiber layer, it is not always necessary to perform the winding of the reinforcement fibers 3 along the extending direction of the tank base body 1 and the reinforcement fibers 3 may be wound around the drum portion of the tank base body 1.

In winding the reinforcement fibers 3 around the tank base body 1, as described previously, the winding is performed while applying the given winding tension to the reinforcement fibers 3 thus capable of generating the desired stress based on the desired stress change curve in the formed fiber layer.

It is sufficient that the tension applied to the reinforcement fibers 3 is approximately 1 to 15000N. In this embodiment, since carbon fibers are used as the reinforcement fibers 3, in the formation of the first fiber layer, the tension applied to the reinforcement fibers 3 is set to 1 to 1000N, preferably 30 to 100N.

The adjustment of the winding tension is performed by the winding tension adjusting portion 8 which is controlled by the control part and the winding tension adjusting portion 8 is configured to apply the given winding tension correlated to the bulging pressure applied to the tank base body 1 to the reinforcement fibers 3.

Particularly, since the bulging pressure is applied to the tank base body 1 as described above, it is possible to apply the further larger winding tension to the reinforcement fibers 3. To be more specific, it is possible to apply the winding tension which is 10 to 100 times as large as the usual winding tension. Accordingly, it is possible to make the slackening of the wound reinforcement fibers 3 difficult.

Further, as described above, around the tank base body 1, the reinforcement fibers 3 to which the resin material for hardening is applied by the resin applying portion of the reinforcement feeding portion 7 is wound.

Accordingly, when the winding of the reinforcement fibers 3 is performed with the larger winding tension, it is possible to remove air bubbles contained in the resin material for hardening and, at the same time, the reinforcement fibers 3 can be increased with respect to a volume ratio between the reinforcement fibers 3 and the resin material for hardening whereby the strength of the formed fiber layer can be enhanced.

In the formation of the fiber layer by the winding of the reinforcement fibers 3 around the tank base body 1, one fiber layer may be formed not only by winding only one turn of the reinforcement fibers 3 around the tank base body 1 but also by winding the multiple turns of the reinforcement fibers 3 around the tank base body 1 when necessary.

At a point of time that the winding of the reinforcement fibers 3 which forms the first fiber layer is finished, the winding of the reinforcement fibers 3 is once stopped and, thereafter, the hardening of the resin material for hardening which is applied to the reinforcement fibers 3 is promoted due to the heat applied to the tank base body 1 thus forming the hardened first fiber layer.

Here, when the ultraviolet-ray-curing type resin material for hardening is used as the resin material for hardening, the reinforcement fibers 3 is wound around the tank base body 1 and, at the same time, ultraviolet rays may be irradiated to the tank base body 1 so as to accelerate the hardening of the resin layer.

Then, after the first fiber layer is hardened, the winding of the reinforcement fibers 3 which form the second fiber layer is started. In this manner, one fiber layer is formed by the winding of the reinforcement fibers 3 and the treatment to harden the resin material for hardening is applied to the wound reinforcement fibers 3.

In this embodiment, although the winding of the reinforcement fibers 3 is once stopped at the point of time that the winding of the reinforcement fibers 3 which forms the first fiber layer is finished, it is not always necessary to stop the winding of the reinforcement fibers 3. That is, by lowering the winding speed of the reinforcement fibers 3, it is possible to harden the resin material for hardening applied to the reinforcement fibers 3 sequentially while performing the winding of the reinforcement fibers 3 thus starting the formation of the next fiber layer continuously.

Figure 9:
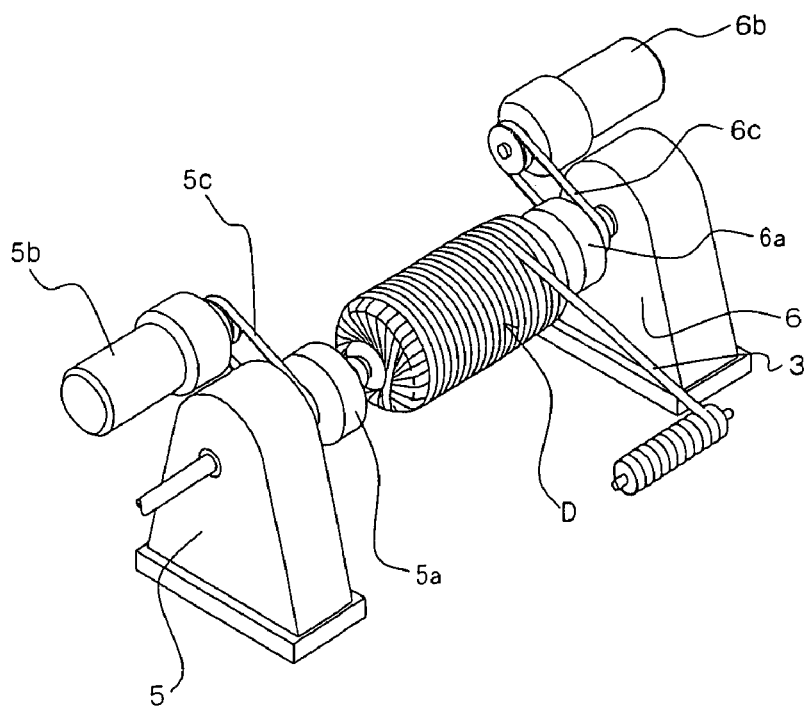
FIG. 9 is an explanatory view showing a winding method of reinforcement fibers to a tank base body.

In performing the winding of the reinforcement fibers 3 for forming the second fiber layer, in the same manner as the winding of the reinforcement fibers 3 which form the first fiber layer, the winding of the reinforcement fibers 3 may be performed in the longitudinal direction of the tank base body 1 or, as shown in FIG. 9, the winding of the reinforcement fibers 3 may be performed along the drum portion of the tank base body 1 in the circumferential direction.

In winding the reinforcement fibers 3 which form the second fiber layer around the tank base body 1, since the first fiber layer is already hardened, it is possible to prevent the generation of the deformation of the first fiber layer attributed to the winding of the reinforcement fibers 3 which form the second fiber layer.

When the reinforcement fibers 3 which form the second fiber layer are wound before the first fiber layer is hardened, the first fiber layer is deformed or slackened and the stress which is expected to be generated in the first fiber layer is alleviated due to the deformation or the slackening thus giving rise to the possibility that the desired compressive stress is not generated. However, by hardening the first fiber layer before the reinforcement fibers 3 which form the second fiber layer are wound, it is possible to eliminate such possibility.

Here, in an actual manufacturing operation, the pressure shell 4 is formed by laminating several tens to several hundred fiber layers and hence, the fiber layer which is formed immediately before the winding of the reinforcement fibers 3 which form the next fiber layer is not always necessary to be completely hardened. That is, it is sufficient that the fiber layer which is already formed by at least two or three layer before as counted from the fiber layer which is to be formed by winding the reinforcement fibers 3 is hardened.

Accordingly, due to the regulation of the winding speed of the reinforcement fibers 3, the resin material for hardening which is applied to the reinforcement fibers 3 can be sequentially hardened while performing the winding of the reinforcement fibers 3 and hence, the fiber layers can be formed continuously.

Particularly, by adjusting the winding speed of the reinforcement fibers 3 in conformity with the hardening speed of the resin material for hardening, it is possible to set the winding speed to a relatively low value and hence, the regulation of the winding tension can be performed accurately and, at the same time, the reliable winding of the reinforcement fibers 3 with no slackening can be performed.

In this manner, the operation to form the next fiber layer while hardening the previously formed fiber layer is repeated and the formation of the fiber layer is finished when the given number of laminated layers is achieved thus forming the pressure shell 4.

Particularly, in laminating the fiber layers by sequentially forming the fiber layers, the pressure applied to the fluid for regulating the pressure is gradually decreased corresponding to the lamination number from the pressure (0.01 to 100 MPa) which is applied at the time of forming the first fiber layer which is the lowermost layer and, at the same time, the tension applied to the reinforcement fibers 3 is gradually increased corresponding to the lamination number from the pressure (1 to 1000N) which is applied at the time of forming the first fiber layer which is the lowermost layer thus forming the respective fiber layers.

Accordingly, after the formation of the high-pressure tank, the pressure shell 4 can have the desired stress change curve and hence, it is possible to control the stresses generated in the fiber layers of the pressure shell 4 to the given stresses and, at the same time, it is possible to increase the limit pressure as much as possible.

Further, in laminating the fiber layers by sequentially forming the fiber layers, to change the tension applied to the reinforcement fibers 3, a kind of the reinforcement fibers 3 to be used may be changed when necessary.

That is, carbon fibers may be used to form the lower fiber layers, while aramid fibers, PBO fibers or the like may be used to form the upper fiber layers to which the large tension is applied.

By changing the kind of the reinforcement fibers 3 corresponding to the tension to be applied to the fiber layer, it is possible to manufacture the high-pressure tank which can further enhance the limit pressure. Further, since the functional properties of the respective reinforcement fibers 3 can be combined, it is possible to achieve the enhancement of functionalities such as the enhancement of the hermetic property, the reduction of weight and the like.

In the high-pressure tank D in which the pressure shell 4 is formed in this manner, the fiber layers are sequentially hardened along with the formation of the respective fiber layers which constitute the pressure shell 4 and hence, the heating and hardening treatment which is performed using an oven or the like after the formation of the high-pressure tank D becomes unnecessary whereby the manufacturing steps can be shortened by omitting the hardening treatment of the manufactured high-pressure tank D.

After the formation of the pressure shell 4, by discharging the fluid for regulating pressure from the inside of the high-pressure tank D, it is possible to apply the given compressive stresses to the respective fiber layers which form the pressure shell 4, particularly inner fiber layers of the pressure shell 4.

Then, the connection between the lower end plate portion 1b of the tank base body 1 and the rear-end connecting member 6a of the rear-end support base 6 is released and, thereafter, the connection between the upper end plate portion 1a of the tank base body 1 and the front-end connecting member 5a of the rear-end support base 5 is released and, thereafter, the completed high-pressure tank D is taken out from the high-pressure tank manufacturing apparatus C.

In the above-mentioned high-pressure tank manufacturing apparatus C, the winding of the reinforcement fibers 3 is performed in a state that both ends of the tank base body 1 is supported on the front-end support base 5 and the rear-end support base 6. However, as shown in FIG. 10, for example, the tank base body 1 is supported in a cantilever manner.

Figure 10:
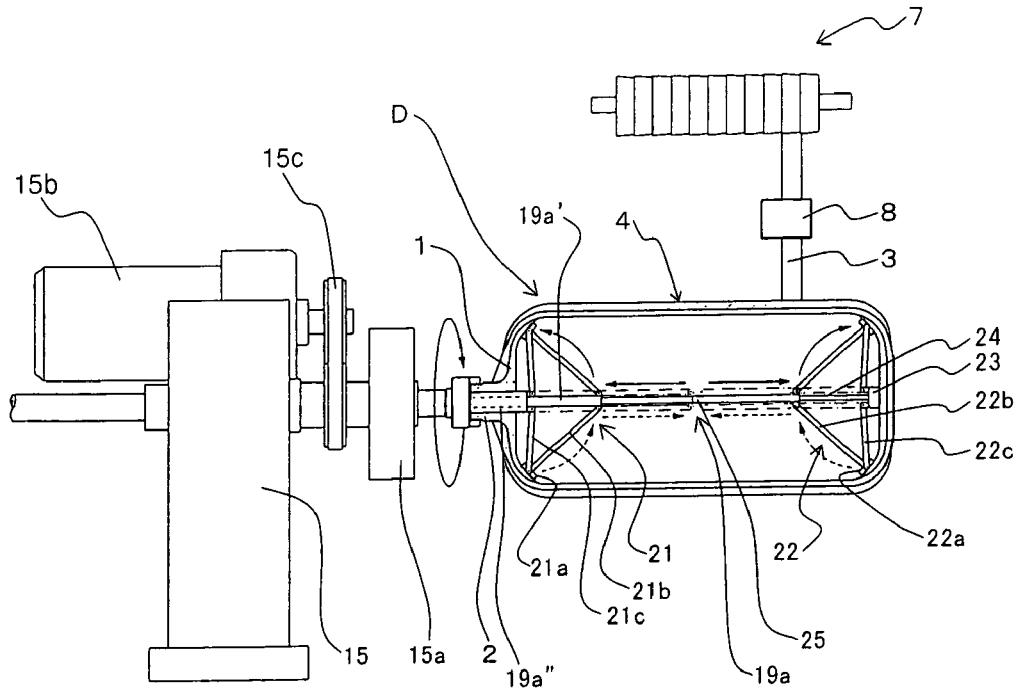
FIG. 10 is an explanatory view of a high-pressure tank manufacturing apparatus for supporting the tank base body in a cantilever manner.
Figure 11:
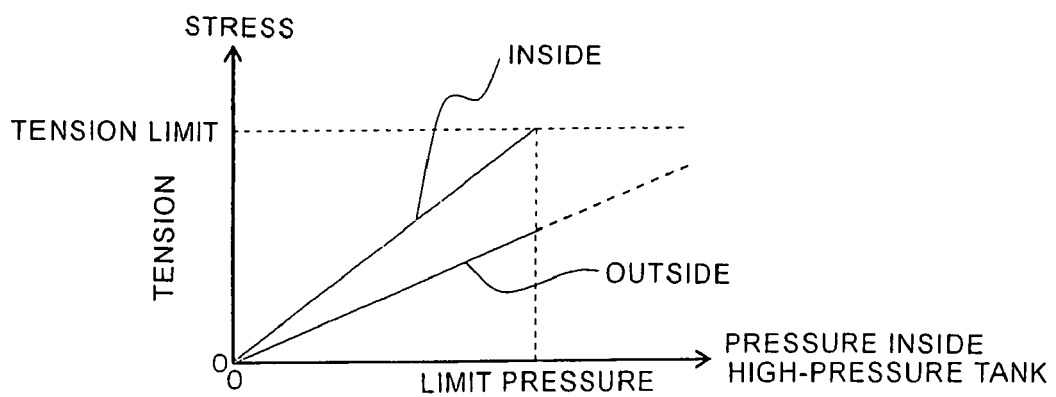
FIG. 11 is a graph showing the relationship between a stress which is applied to a pressure shell formed in a conventional high-pressure tank and a pressure inside the high-pressure tank.

That is, in the high-pressure tank manufacturing apparatus C' shown in FIG. 10, a feed pipe 19a which is inserted into the inside of the tank base body 1 and supplies the fluid for regulating pressure in the inside of the tank base body 1 is mounted on a front-end support base 15, the feed pipe 19a is inserted to a deep portion of the tank base body 1, and the tank base body 1 is fixedly supported by a first end plate support body 21 and a second end plate support body 22 which are mounted on the feed pipe 19a.

The feed pipe 19a is a duplicate pipe which is constituted of an inner pipe 19a' which feeds the fluid for regulating pressure into the inside of the tank base body 1 and an outer pipe 19a" which discharges the pressure regulating fluid fed to the inside of the tank base body 1.

Further, with respect to this embodiment particularly, a bottom support shaft 24 is inserted in the inner pipe 19a', wherein the bottom support shaft 24 forms a bottom contact body 23 which is capable of contacting with the lower end plate portion 1b of the tank base body 1 on a distal end thereof.

Further, the inner pipe 19a' is constituted in a reciprocating manner and, at the same time, along with the advancing and retracting of the inner pipe 19a', the inner pipe 19a' is configured to make a cylindrical reciprocating cylindrical shaft 25 which is annularly mounted on the bottom support shaft 24 advance or retract along the bottom support shaft 24.

A plurality of inner surface support members 21*a* which are brought into contact with an inner surface of the tank base body 1 are mounted on the first end plate support body 21.

Each inner surface support member 21*a* is constituted of a first arm 21*b* which has one end thereof pivotally mounted on the inner surface support member 21*a* and another end thereof pivotally mounted on the inner pipe 19*a*' and a second arm 21*c* which has one end thereof pivotally mounted on the inner surface support member 21*a* and another end thereof pivotally mounted on the outer pipe 19*a*", wherein each inner surface support member 21*a* is brought into contact with the inner surface of the tank base body 1 due to the reciprocating manipulation of the inner pipe 19*a*'.

A plurality of inner surface support members 22 a which are brought into contact with an inner surface of the tank base body 1 are mounted on the second end plate support body 22.

Each inner surface support member 22*a* is constituted of a first arm 22*b* which has one end thereof pivotally mounted on the inner surface support member 22*a* and another end thereof pivotally mounted on the reciprocating cylindrical shaft 25 and a second arm 22*c* which has one end thereof pivotally mounted on the inner surface support member 22*a* and another end thereof pivotally mounted on the bottom contact body 23, wherein the reciprocating cylindrical shaft 25 is reciprocated by the reciprocating manipulation of the inner pipe 19*a*' and is brought into contact with the inner surface of the tank base body 1.

Accordingly, with the reciprocating manipulation of the inner pipe 19*a*', the inner surface support member 21*a* of the upper end plate support body 21 and the inner surface support member 22*a* of the lower end plate support body 22 can be expanded in an umbrella shape whereby it is possible to support the tank base body 1 from the inside.

Due to such a constitution, it is possible to use a material having resiliency such as rubber, plastic or the like for manufacturing the tank base body 1. Further, it is possible to form a plurality of fiber layers on the tank base body 1 having the resiliency using the reinforcement fibers 3 thus using the tank base body 1 as an ordinary liner.

Still further, in forming the high-pressure tank D using the tank base body 1 having the resiliency, it is desirable that, after the formation of the high-pressure tank D, resin coating is applied to the inner surface of the tank base body 1 so as to prevent the leaking of an accommodated object such as oxygen or thermal spraying of a non-conductive body is performed so as to prevent the occurrence of the erosion attributed to different kinds of conductors.

The above-mentioned embodiment is directed to the high-pressure tank manufacturing apparatus C which forms the high-pressure tank D by forming the pressure shell 4 on the tank base body 1 having a pressurized container shape. Here, however, a base body which forms the pressure shell with the winding of the reinforcement fibers 3 is not limited to the tank base body 1 and may be a wire material (CFRP rod), a cylindrical pipe (CFRP) or a rectangular body having an accommodating space in the inside thereof.

Finally, a result of a weight ratio on calculation, that is, a weight reduction ratio on calculation between a high-pressure tank which has a conventional pressure shell formed of CFRP and the high-pressure tank which has the pressure shell formed of the present invention, is shown in Table 1. Here, for facilitating the comparison, only the weight ratio in the circumferential direction is considered. The weight ratio is not influenced by an inner diameter of the high-pressure tank.

TABLE 1

| maximum pressure (MPa) | weight ratio (%) | |
|---|---|---|
| | CFRP strength at 2000 MPa | CFRP strength at 2500 MPa |
| 200 | 5.8 | 4.5 |
| 400 | 13.6 | 10.2 |
| 600 | 24.2 | 17.5 |
| 800 | 38.9 | 26.8 |
| 1000 | 60.0 | 38.9 |

In this manner, it is understood that by adopting the pressure shell 4 of the present invention, it is possible to manufacture the products having the same pressure resistance as the conventional pressure shell as light-weighted products.

Here, in manufacturing the high-pressure tank using 12 k of carbon fibers which has the 2000 MPa of the CFRP strength and the maximum pressure of 400 MPa, the pressure of the fluid for regulating pressure and the tension applied to the reinforcement fibers are adjusted as follows so as to obtain the targeted stress inclination. That is, the formation of the lowermost fiber layer is started by setting the pressure of the fluid for regulating pressure to 0.4 MPa and the tension applied to the reinforcement fibers to 50N, while formation of the outermost fiber layer is finished by setting the pressure of the fluid for regulating pressure to 0 MPa and the tension applied to the reinforcement fibers to 150N.

INDUSTRIAL APPLICABILITY

The pressure shell, the high-pressure tank provided with the pressure shell, the manufacturing method of the high-pressure tank and the manufacturing apparatus of the high-pressure tank according to the present invention can form the pressure shell of high pressure resistance and the high-pressure tank provided with such a pressure shell and hence, it is possible to increase the accommodating quantity of the material to be accommodated whereby it is possible to provide the high-pressure tank which is excellent in storing hydrogen gas, liquefied hydrogen, oxygen gas or liquefied oxygen.

The invention claimed is:

1. A manufacturing method of the high-pressure tank provided with a pressure shell which is formed by winding reinforcement fibers provided with resin material for hardening on an outer surface of an hollow tank base body, comprising:
   filling fluid under pressure regulation in an inside of the tank base body,
   forming a lowermost fiber layer of the reinforcement fibers on the tank base body while applying pressure to the fluid under pressure regulation to a given pressure and the reinforcement fibers are wound around the tank base body while applying a given tension to the reinforcement fibers,
   laminating second fiber layers over the lowermost fiber layer to form upper fiber layers, the second fiber layers being laminated in multiple layers in a state that the pressure applied to the fluid under pressure regulation is gradually decreased corresponding to a number of laminated layers of the second fiber layers, and the given tension applied to the reinforcement fibers of the second fiber layers is gradually increased corresponding to the number of laminated layers of the second fiber layers thus forming the pressure shell, and emptying the inside of the tank base body such that a compressive force is applied to the lowermost fiber layers and, simultaneously, a tensile force is applied to the upper fiber layers.

2. A manufacturing method according to claim 1, wherein in forming the lowermost fiber layer, the lowermost fiber layer is formed by winding the reinforcement fibers around the tank base body while applying a tension of 1 to 1000 N to the reinforcement fibers, with a pressure applied to the fluid under pressure regulation set to 0.01 to 100 MPa.

3. A manufacturing method of a high-pressure tank according to claim 1, wherein the lowermost and the second fiber layers are formed by accelerating hardening of the resin material for hardening applied to the reinforcement fibers by heating the fluid filled under pressure regulation.

* * * * *